United States Patent
Yeh

(10) Patent No.: US 11,850,812 B2
(45) Date of Patent: Dec. 26, 2023

(54) ENVIRONMENTALLY FRIENDLY STRAW AND MANUFACTURING METHOD THEREOF

(71) Applicant: Jia-Cheng Yeh, New Taipei (TW)

(72) Inventor: Jia-Cheng Yeh, New Taipei (TW)

( * ) Notice: Subject to any disclaimer, the term of this patent is extended or adjusted under 35 U.S.C. 154(b) by 782 days.

(21) Appl. No.: 16/727,916

(22) Filed: Dec. 27, 2019

(65) Prior Publication Data
US 2021/0197508 A1   Jul. 1, 2021

(51) Int. Cl.
*B29D 23/00*   (2006.01)
*A47G 21/18*   (2006.01)
*B29L 23/00*   (2006.01)

(52) U.S. Cl.
CPC ............. *B29D 23/00* (2013.01); *A47G 21/18* (2013.01); *B29L 2023/008* (2013.01)

(58) Field of Classification Search
CPC ...... A47G 21/18; B31D 5/0095; B24B 33/02; B29D 23/00; B29L 2023/008
See application file for complete search history.

(56) References Cited

U.S. PATENT DOCUMENTS

| | | | |
|---|---|---|---|
| 2006/0223427 A1* | 10/2006 | Tsumuraya | B24B 33/02 451/61 |
| 2020/0009759 A1* | 1/2020 | Jiang | B27M 1/08 |
| 2021/0153674 A1* | 5/2021 | Mohamaddi | B32B 3/26 |

* cited by examiner

*Primary Examiner* — Tuongminh N Pham
(74) *Attorney, Agent, or Firm* — Leong C. Lei

(57) ABSTRACT

The invention teaches an environmentally friendly straw and its manufacturing method. The straw includes a tubular body having a through channel inside connecting two openings respectively at two ends of the tubular body, an outer layer surrounding the tubular body between the two openings formed by a leveling machine, an inner layer, as an inner wall of the tubular body, surrounding the channel formed by a honing machine. The straw is manufactured by leveling the tubular body, and honing the channel by a honing machine. As such, a smooth layer between the channel and the tubular body is achieved so that the straw is convenient to clean and use.

5 Claims, 17 Drawing Sheets

ENVIRONMENTALLY FRIENDLY STRAW AND MANUFACTURING METHOD THEREOF

BACKGROUND OF THE INVENTION

(a) Technical Field of the Invention

The present invention is generally related to straws, and more particular to an environmentally friendly straw and its manufacturing method.

(b) Description of the Prior Art

For environmental protection, many countries prevent the use of plastic bags, cups, and straws. Most people are also gradually used to bring their own bags, cups, and straws. Cleaning for these food-related products is important. However, it is difficult to clean the inner wall of a straw when it is dirty.

SUMMARY OF THE INVENTION

A major objective of the present invention is to employ a honing machine to polish an inner wall of a straw so that the straw is convenient to clean and use.

To achieve the objective, the environmentally friendly straw includes a tubular body having a through channel inside connecting two openings respectively at two ends of the tubular body, an outer layer surrounding the tubular body between the two openings formed by a leveling machine, an inner layer, as an inner wall of the tubular body, surrounding the channel formed by a honing machine.

The straw is manufactured by first leveling the tubular body by a leveling machine so as to enhance a straightness of the tubular body up to an accuracy below 0.01 mm. The leveled tubular body's inner wall is then honed by a honing machine by reciprocally threading a spinning abrasive element into the channel of the tubular body through the openings. As such, a smooth inner layer between the channel and the tubular body having a center line average roughness (Ra) below $0.025\mu$ is achieved so that the straw is convenient to clean and use.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
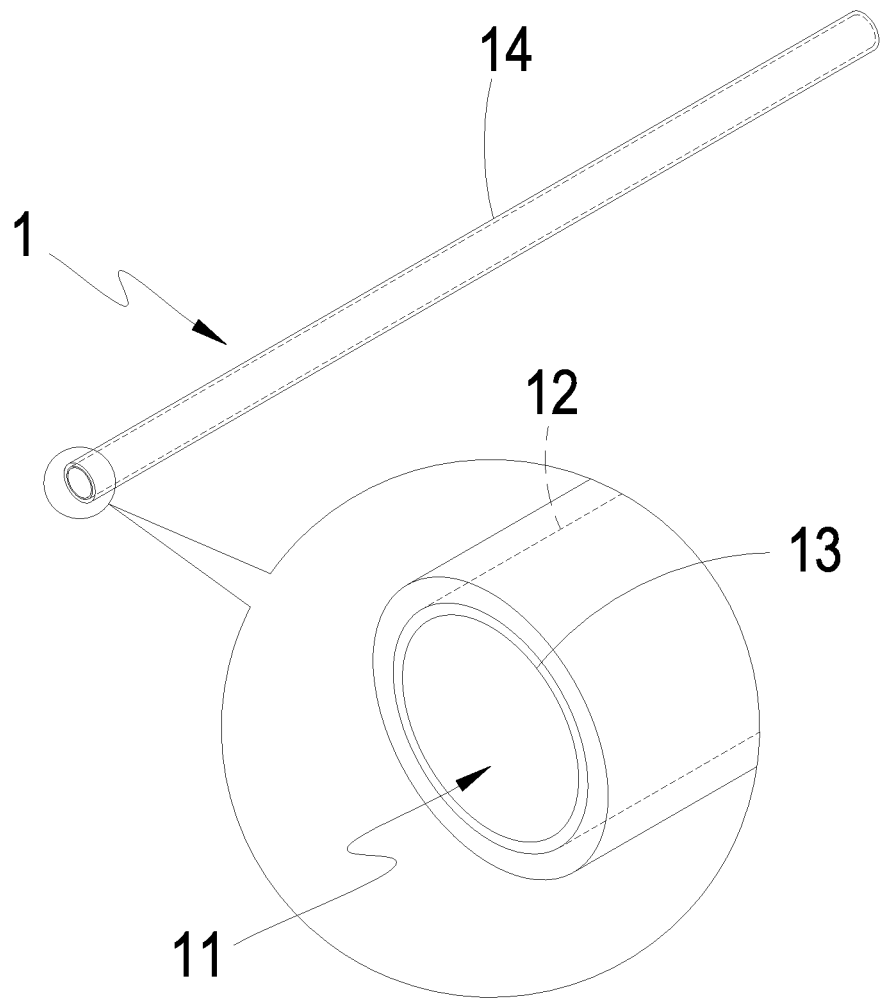
FIG. 1 is a perspective diagram showing an environmentally friendly straw according to an embodiment of the present invention.
Figure 2:
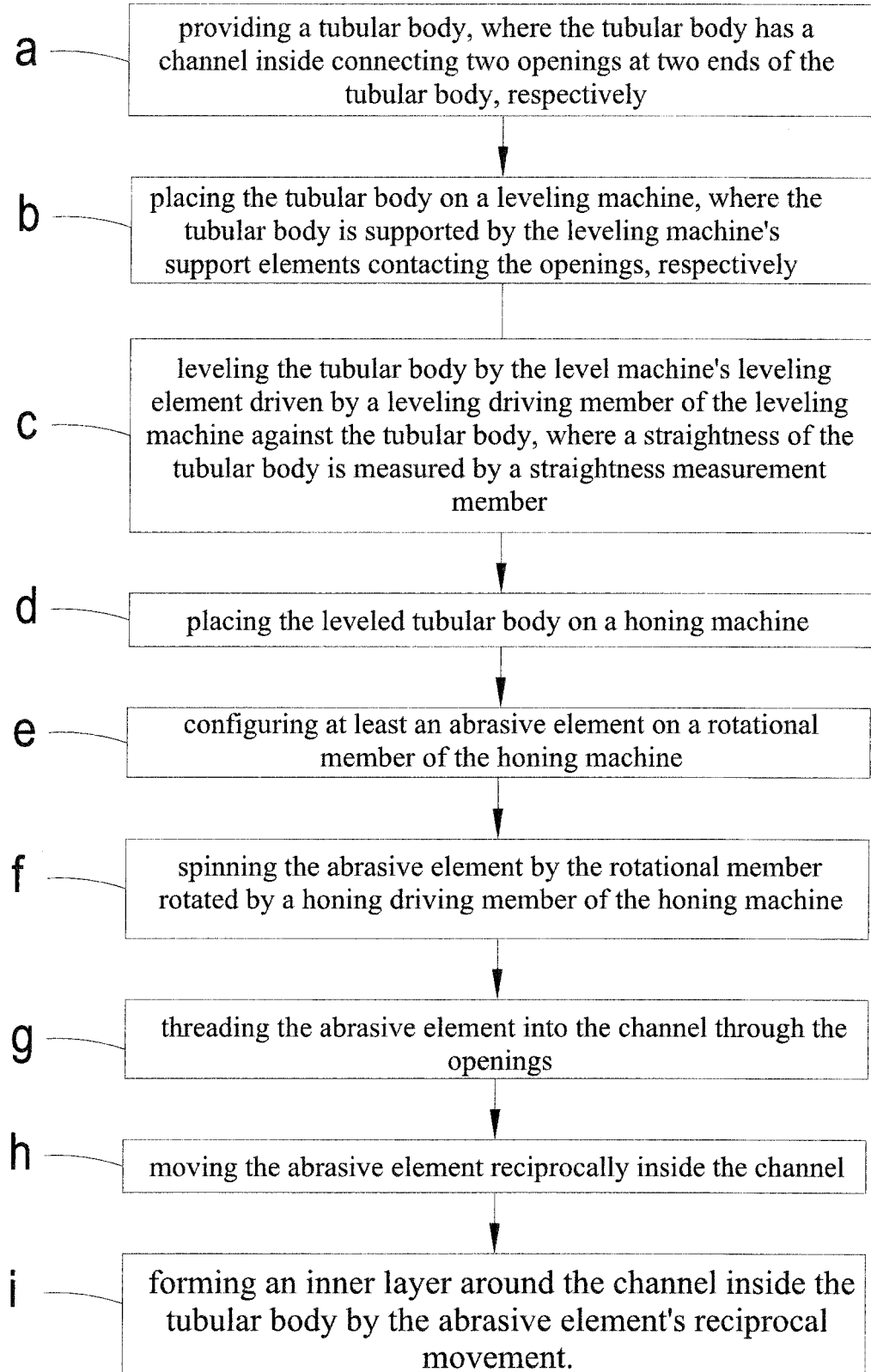
FIG. 2 is a flow diagram showing the steps of manufacturing the environmentally friendly straw of FIG. 1 according to an embodiment of the present invention.
Figure 3:
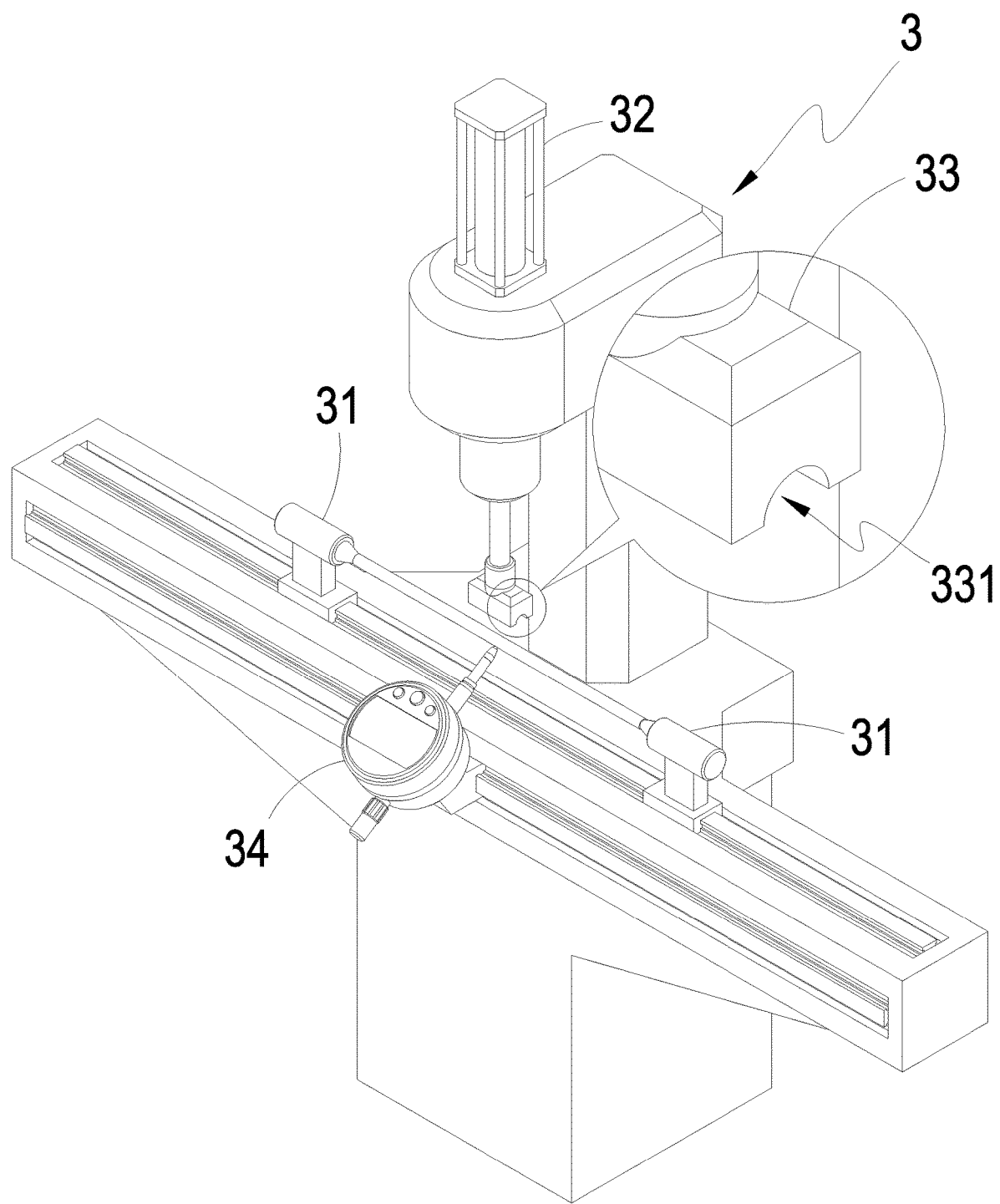
FIG. 3 is a perspective diagram showing a leveling machine used in manufacturing the environmentally friendly straw of FIG. 1.
Figure 4:
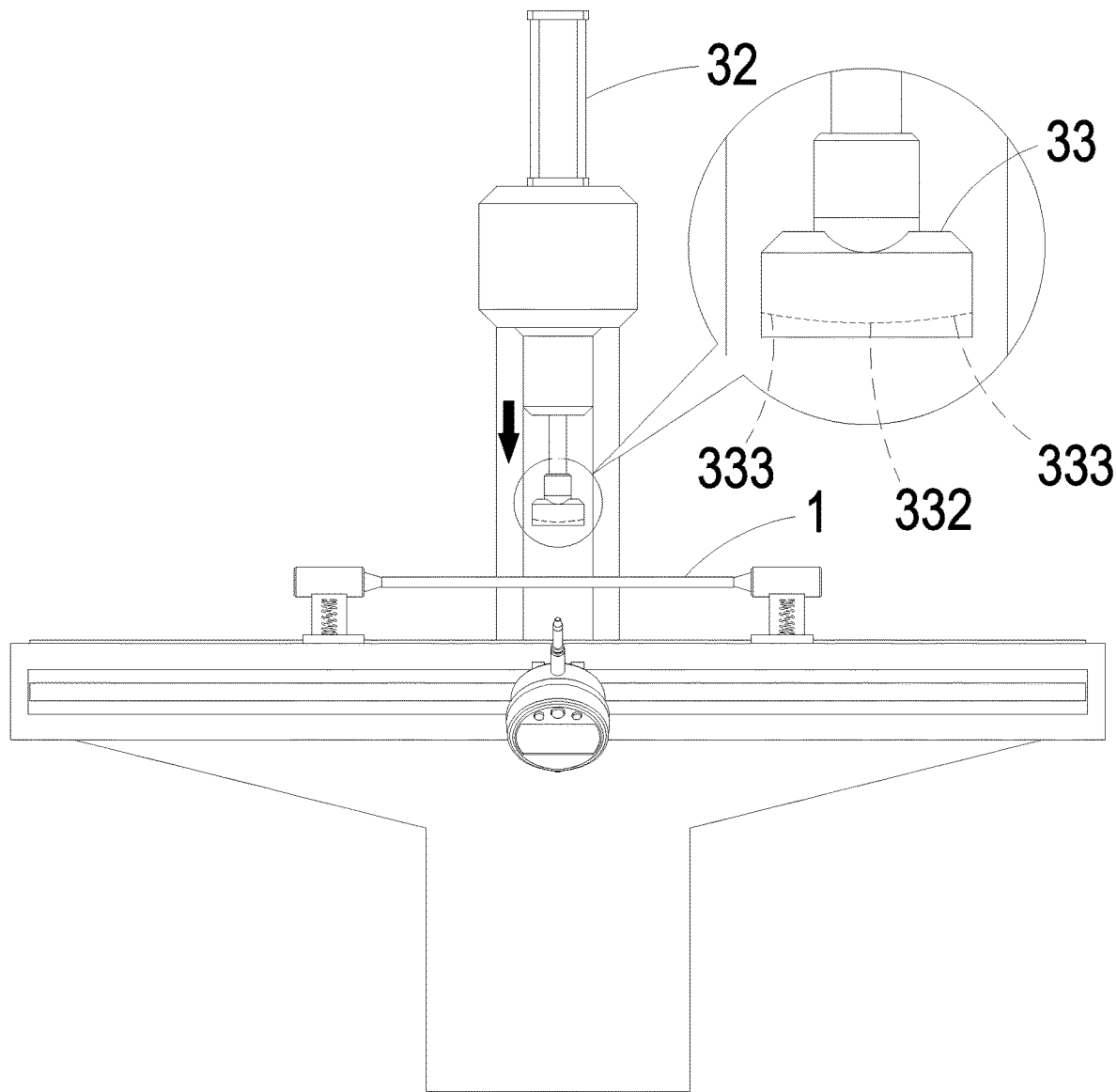
FIG. 4 is a front-view diagram showing a scenario of the leveling machine of FIG. 3 in operation.
Figure 5:
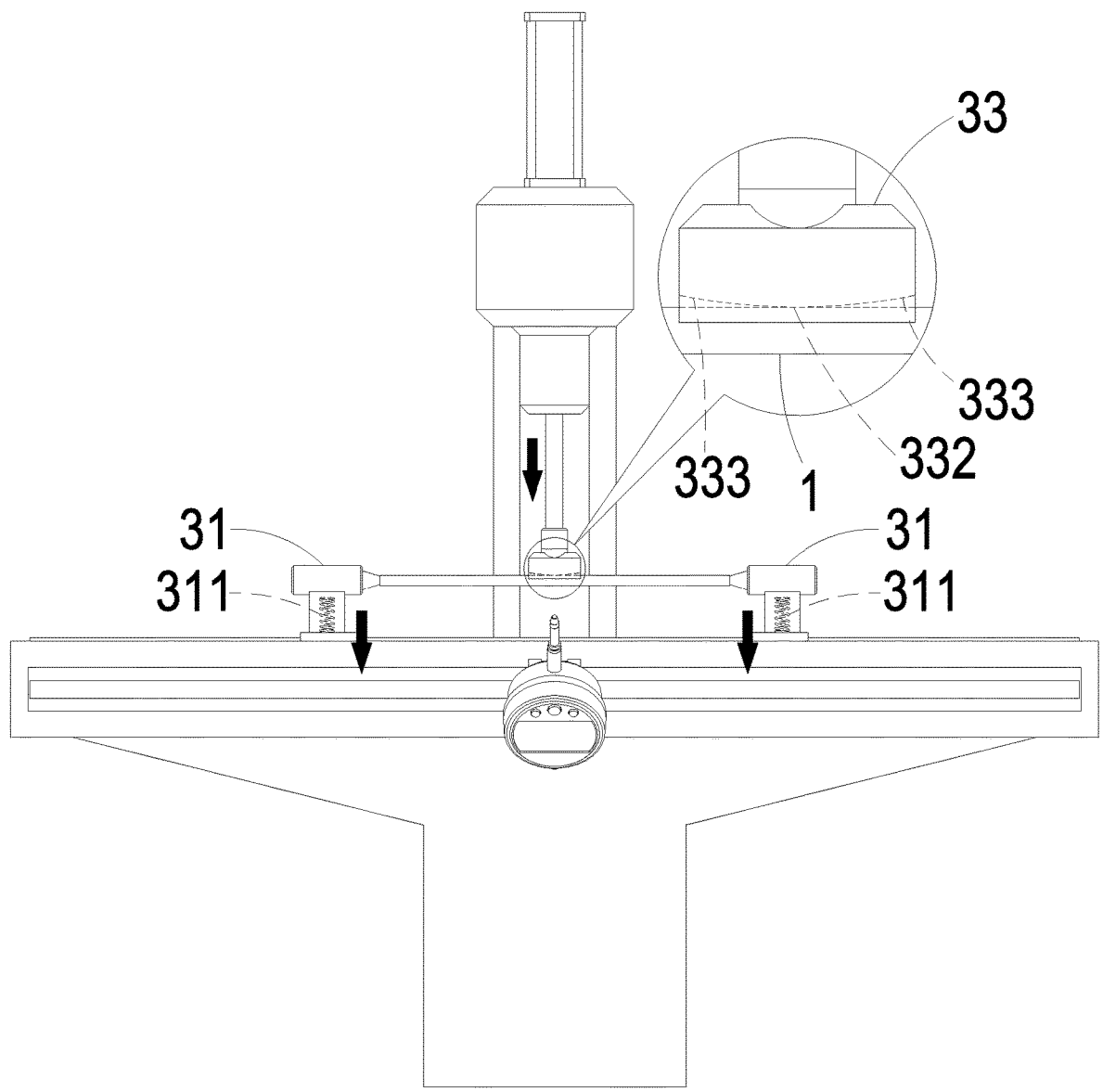
FIG. 5 is a front-view diagram showing another scenario of the leveling machine of FIG. 3 in operation.
Figure 6:
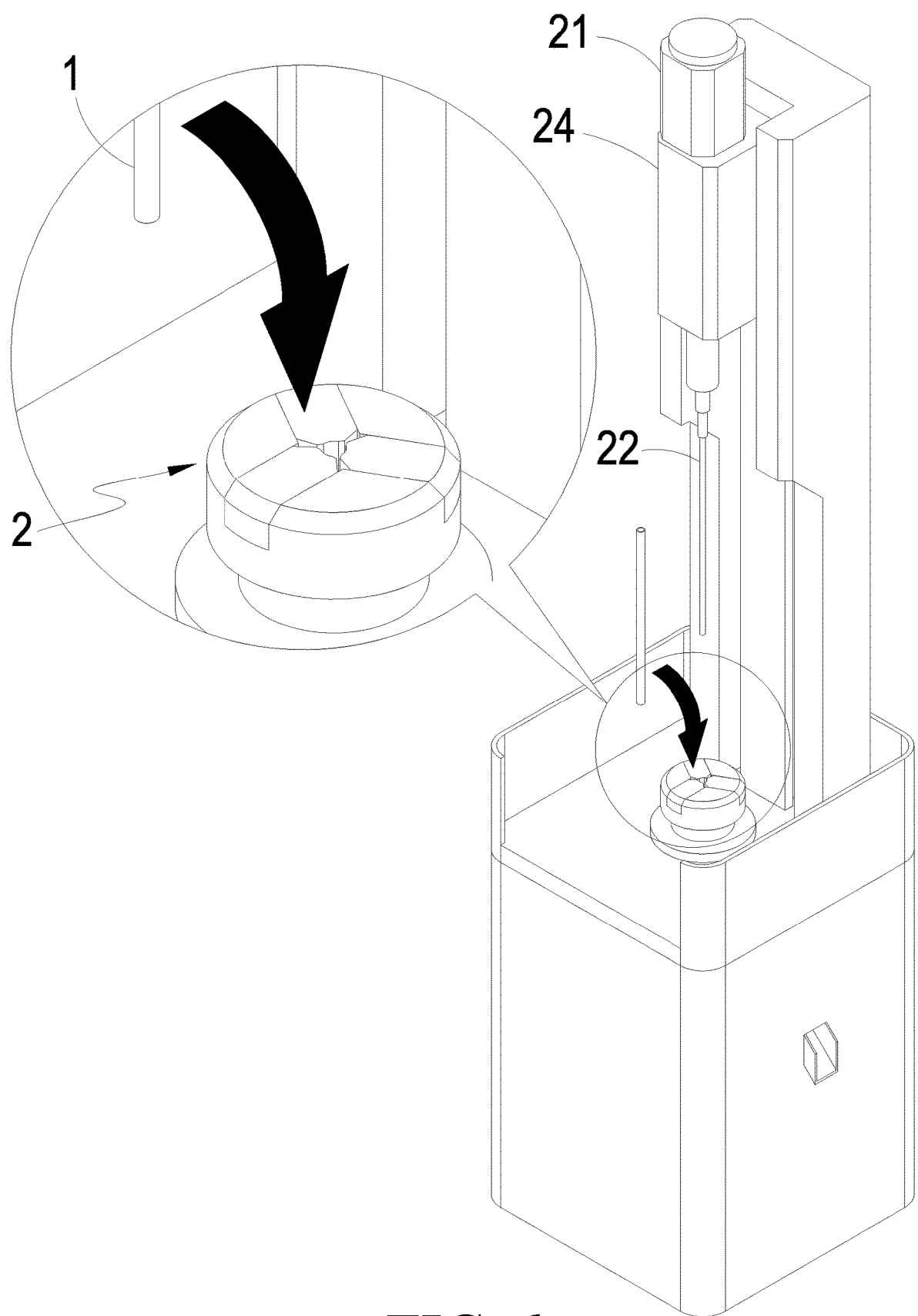
FIG. 6 is a perspective diagram showing how the environmentally friendly straw of FIG. 1 is placed on a honing machine according to a first embodiment.
Figure 7:
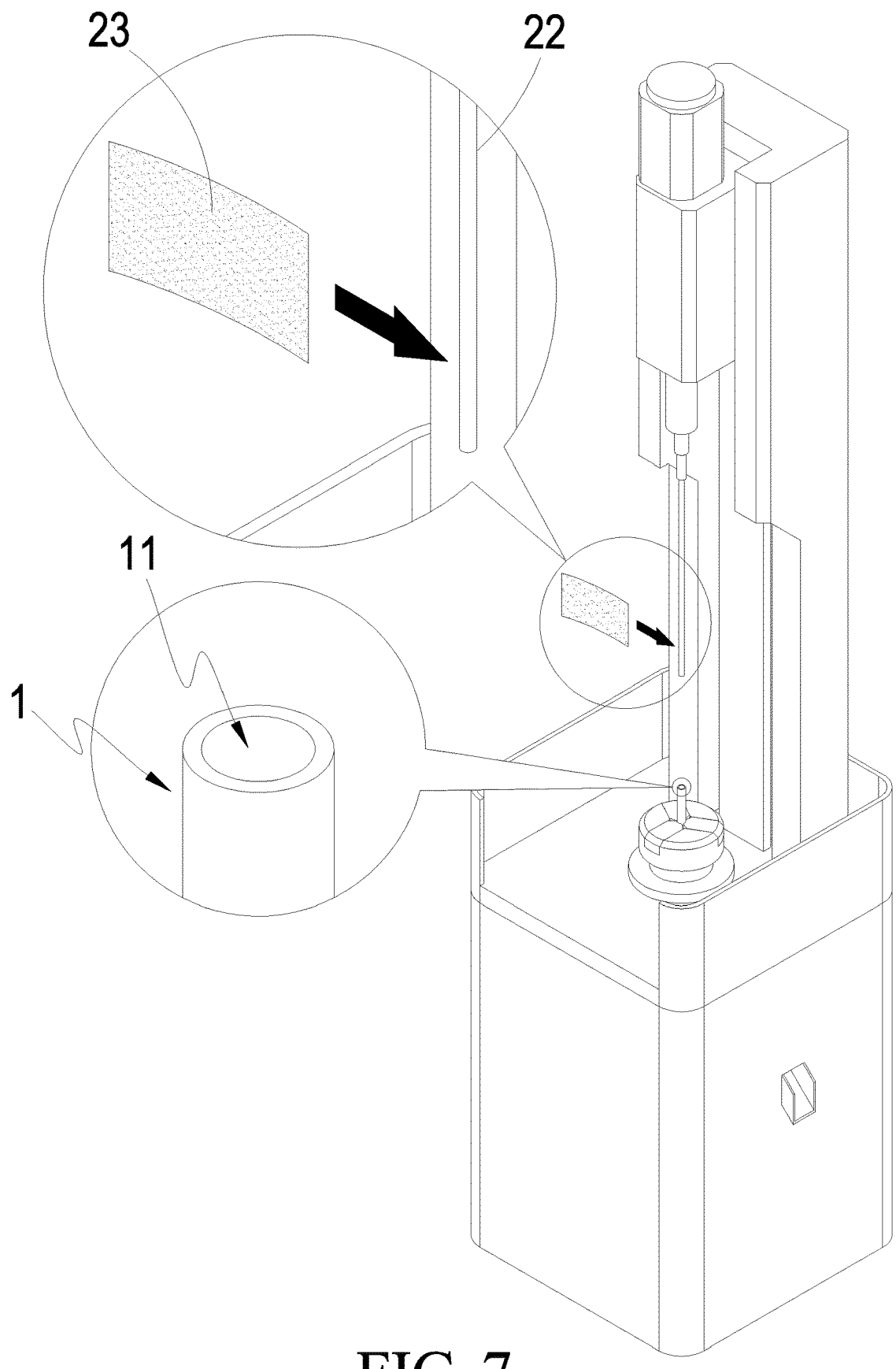
FIG. 7 is a perspective diagram showing how an abrasive element is installed on the honing machine of FIG. 6.
Figure 8:
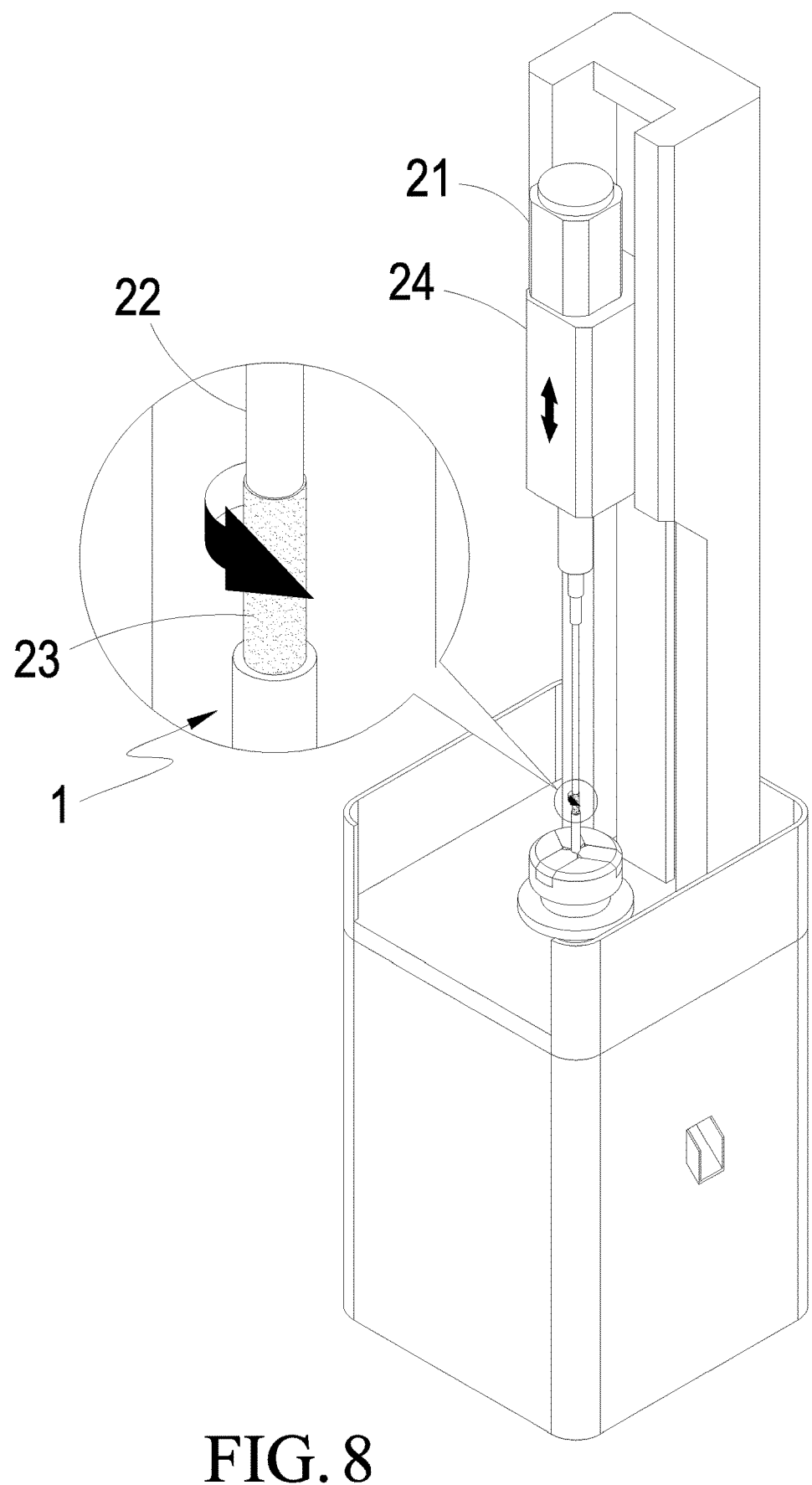
FIG. 8 is a perspective diagram showing a scenario of the environmentally friendly straw of FIG. 1 honed on the honing machine of FIG. 7.
Figure 9:
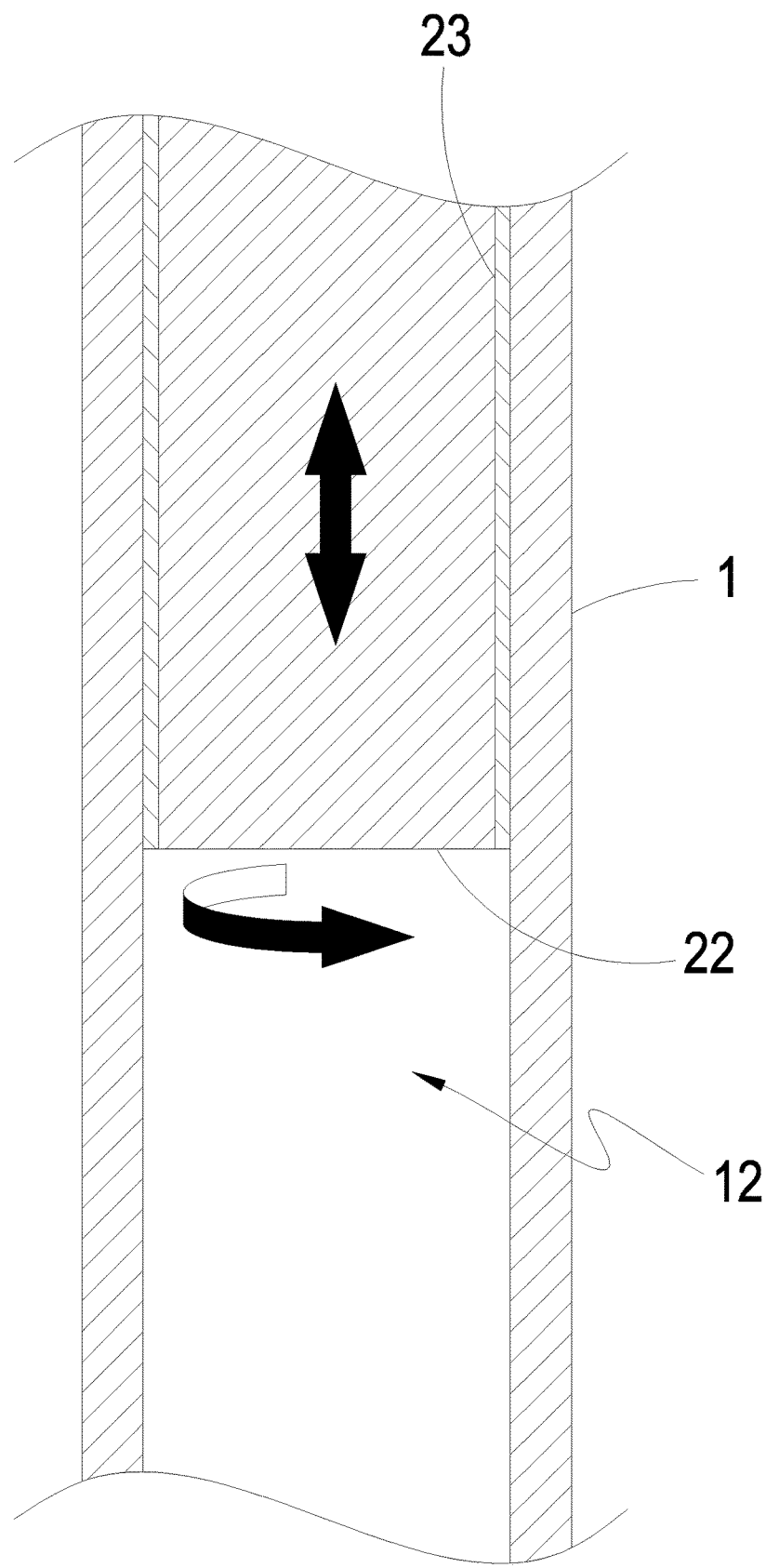
FIG. 9 is a schematic diagram showing another scenario of the environmentally friendly straw of FIG. 1 honed on the honing machine of FIG. 7.
Figure 10:
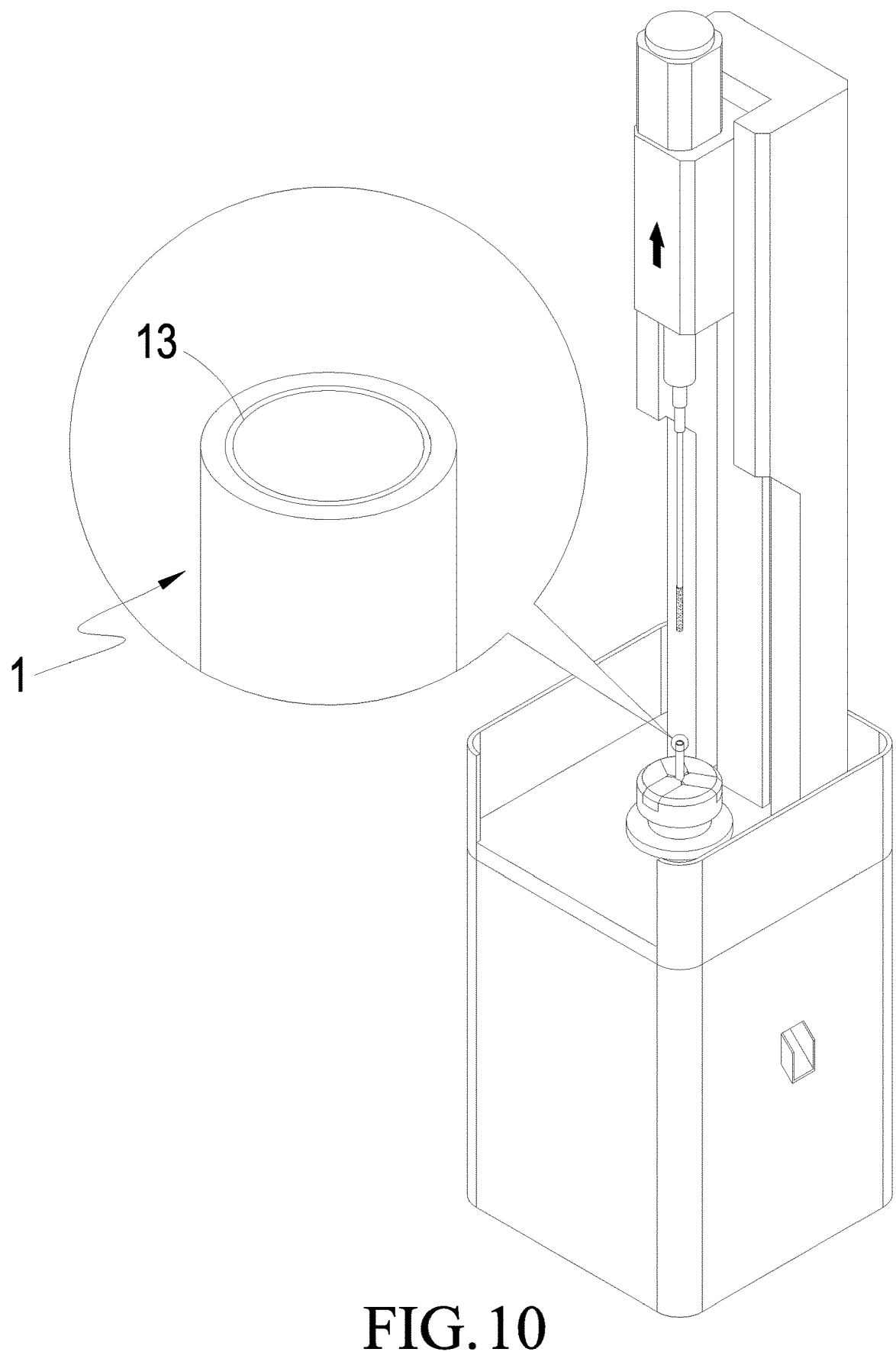
FIG. 10 is a perspective diagram showing the environmentally friendly straw of FIG. 1 after honing on the honing machine of FIG. 7.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 1 to 10, an environmentally friendly straw according to a first embodiment of the present invention includes the following components.

A tubular body 1 has a through channel 12 inside connecting two openings 11 respectively at two ends of the tubular body 1. The tubular body 1 is made of metal, glass, or other material.

An inner layer 13, as an inner wall of the tubular body 1, surrounds the channel 12. The inner layer 13 is formed by a honing machine 2. In the present embodiment, the honing machine 2 is an upright honing machine 2. Alternatively, the honing machine 2 may also be a horizontal honing machine 2.

The honing machine 2 includes a honing driving member 21, a rotational member 22, and at least an abrasive element 23. The rotational member 22 is joined to and engaged by the honing driving member 21, and the abrasive element 23 is configured around the rotational member 22. The honing driving member 21 therefore drives the rotational member 22 and the abrasive element 23 as well to turn. In the present embodiment, the honing driving member 21 is a motor, and the abrasive element 23 is one of sandpaper, millstone, sand strip, and foam sandpaper. The present embodiment uses sandpaper as example.

In the present embodiment, the honing machine 2 further includes a first reciprocal member 24 engaging the rotational member 22 into a reciprocal movement.

The environmentally friendly straw further includes an outer layer 14 around the tubular body 1 between the two openings 11. The outer layer 14 is formed by a leveling machine 3.

The leveling machine 3 includes a number of support elements 31 holding the environmentally friendly straw in between, a leveling driving member 32 positioned to a side to the support elements 31 (the present embodiment has a rotatable cylindrical as an example of the leveling driving member 32), a leveling element 33 configured to a bottom end of the leveling driving member 32, and a straightness measurement member 34 measuring a levelness of the tubular body 1. A bottom side of the leveling element 33 has a trough 331. Inside and along the trough 331, there is a protrusion 332 and two recesses 333 next to the two ends of protrusion 332, respectively. A convex shape is thereby formed inside the trough 331. A cushion element 311 is beneath each support element 31.

According to the above description, the tubular body 1 is thereby polished by the honing machine 2 to form a smooth inner layer 13 so that the environmentally friendly straw may be cleaned thoroughly.

The environmentally friendly straw is manufactured through the following steps:

(a) providing a tubular body, where the tubular body has a channel inside connecting two openings at two ends of the tubular body, respectively;

(b) placing the tubular body on a leveling machine, where the tubular body is supported by the support elements contacting the openings, respectively;

(c) leveling the tubular body by a leveling element driven by a leveling driving member of the leveling machine against the tubular body, where a straightness of the tubular body is measured by a straightness measurement member;

(d) placing the leveled tubular body on a honing machine;

(e) configuring at least an abrasive element on a rotational member of the honing machine;

(f) spinning the abrasive element by the rotational member rotated by a honing driving member of the honing machine;

(g) threading the abrasive element into the channel through the openings;

(h) moving the abrasive element reciprocally inside the channel; and (i) forming an inner layer around the channel inside the tubular body by the abrasive element's reciprocal movement.

Ordinarily, a metallic tube would be leveled before it is out of factory. However, this leveling can only achieve 0.05 mm~01 mm deformation for the tubular body 1. Honing a tubular body with this amount of deformation is rather difficult and not cost-effective, as the smoothness is hard to control, working time is prolonged. Therefore, in the present invention, the tubular body 1 is first further leveled on the leveling machine 3 before honing.

For this leveling work, the tubular body 1 is first supported between support elements 31, and its straightness is measured by the straightness measurement member 34 to detect places along the tubular body 1 having greater deformation. Then, the leveling driving member 32 drives the leveling element 33, for example, through a hydraulic means, to level the tubular body 1.

The leveling element 33's trough 331 has a semi-cylindrical shape compatible to the tubular body 1's shape. When leveling is performed, the trough 331 is aligned with the tubular body 1 and, through the recesses 333, only the protrusion 332 inside the trough 331 would contact with the tubular body 1. In this way, the tubular body 1 would not be pressed and deformed. Then, the tubular body 1, based on its own rigidity, is leveled by the repeated contact of the leveling element 33. If the leveling driving member 32 exerts too much a pressure, the support elements 31 would descend by compressing the cushion element 311 so that the tubular body 1 would not be deformed. As such, the tubular body 1 may be leveled until its deformation is less than 0.01 mm, and the subsequent honing can be performed more smoothly.

Compared to ordinary honing by lathe or internal hole grinder, the reciprocal honing after the above leveling may polish the inner layer 13 for further smoothness until the inner layer 13 has a center line average roughness (Ra) below 0.025μ, conforming to the standard of various nations. As the inner layer 13 is very smooth, the channel 12 is not clogged by larger particles, is difficult to contaminate, and is more convenient to clean.

In the present embodiment, an upright honing machine 2 is used as an example. Therefore, a step (c1) may be performed after the step (c), where the first reciprocal member engages the rotational member and the abrasive element into a reciprocal movement to conduct reciprocal honing. However, manual or other reciprocal operation is also possible.

Figure 11:
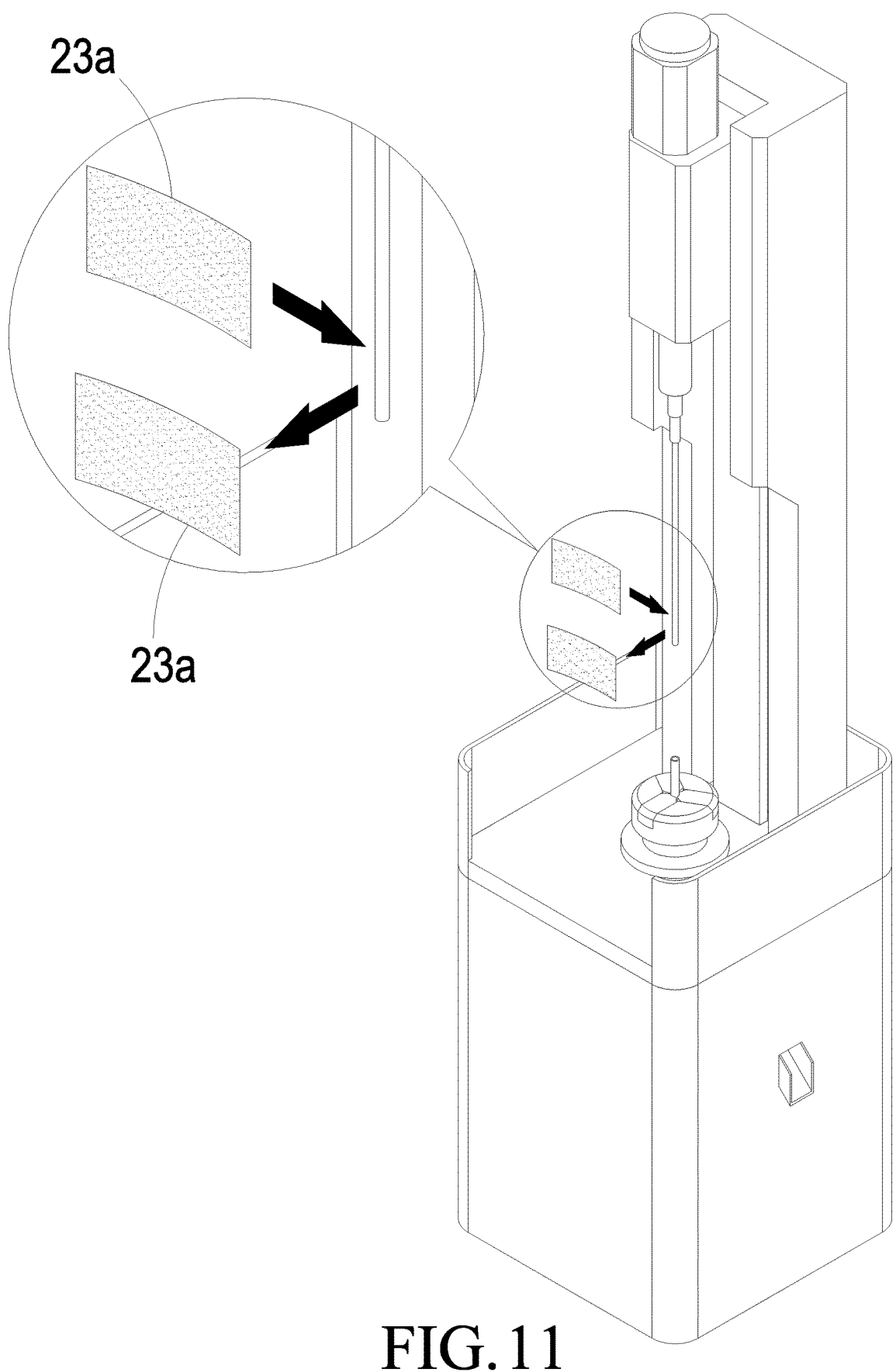
FIG. 11 is a perspective diagram showing how abrasive elements are installed on a honing machine according to a second embodiment of the present invention.
Figure 12:
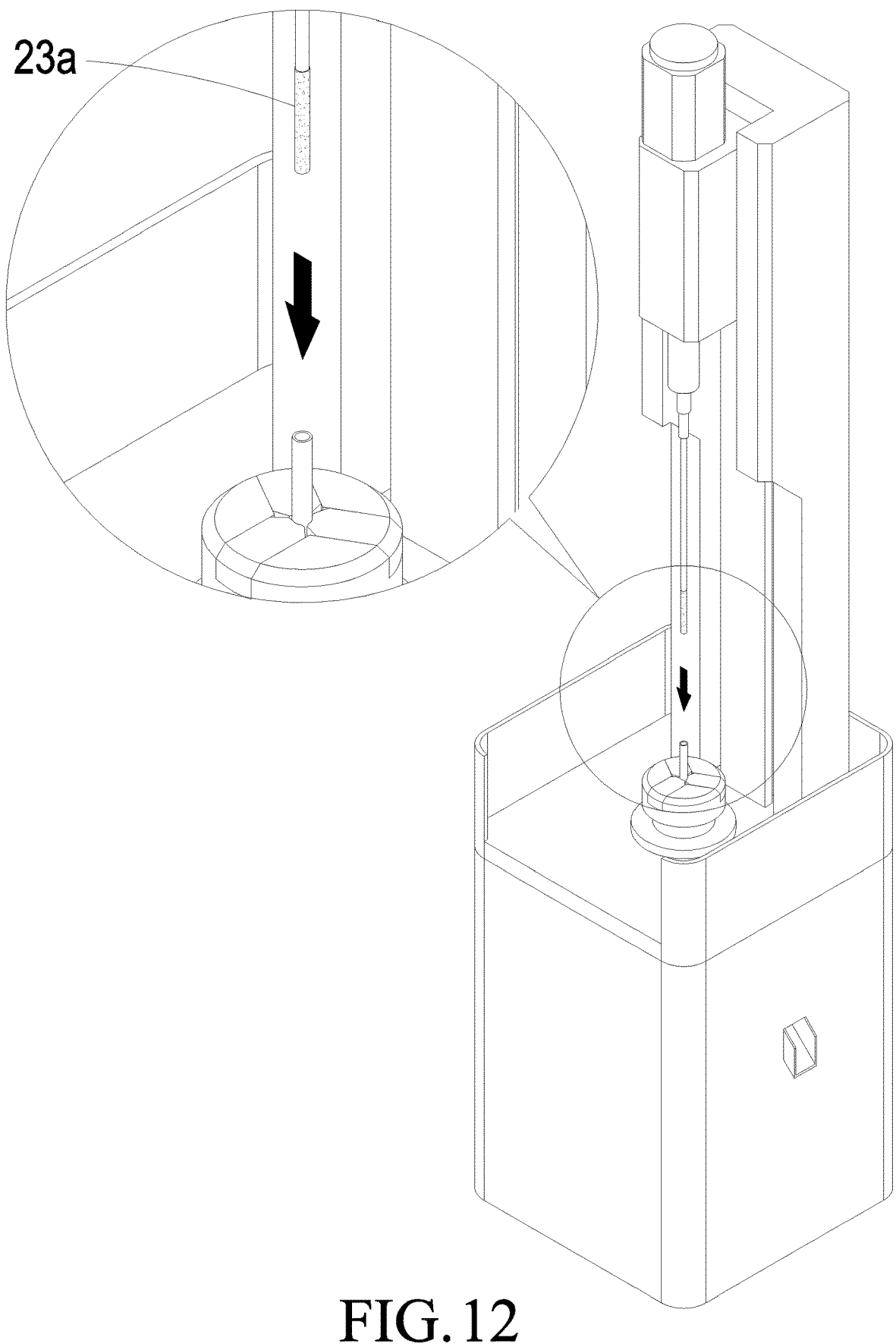
FIG. 12 is a perspective diagram showing a scenario of the environmentally friendly straw of FIG. 1 honed on the honing machine of FIG. 11.

As shown in FIGS. 11 and 12, a step (h1) may be conducted after the step (h) where, after a first round of honing, the abrasive element 23a may be replaced by another abrasive element 23a of a finer grid size, and a second round of honing is conducted.

As such, an initial honing is performed with an abrasive element 23a of a greater grit size, and a second honing is conducted with abrasive element 23a of a finer grit size. In this way, not only honing performance, but also honing accuracy is enhanced.

Figure 13:
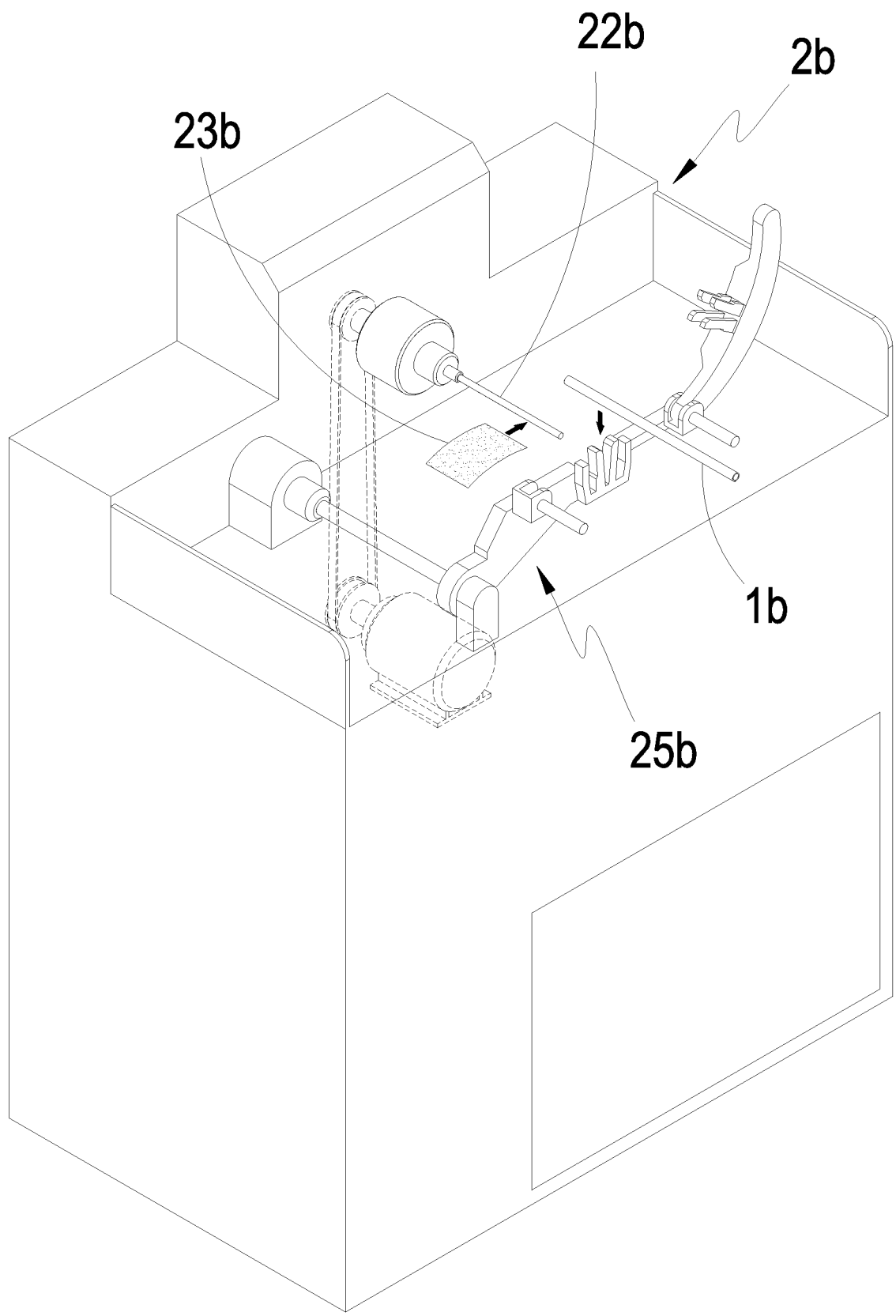
FIG. 13 is a perspective diagram showing a scenario of placing the environmentally friendly straw of FIG. 1 on a honing machine according to a third embodiment of the present invention.
Figure 14:
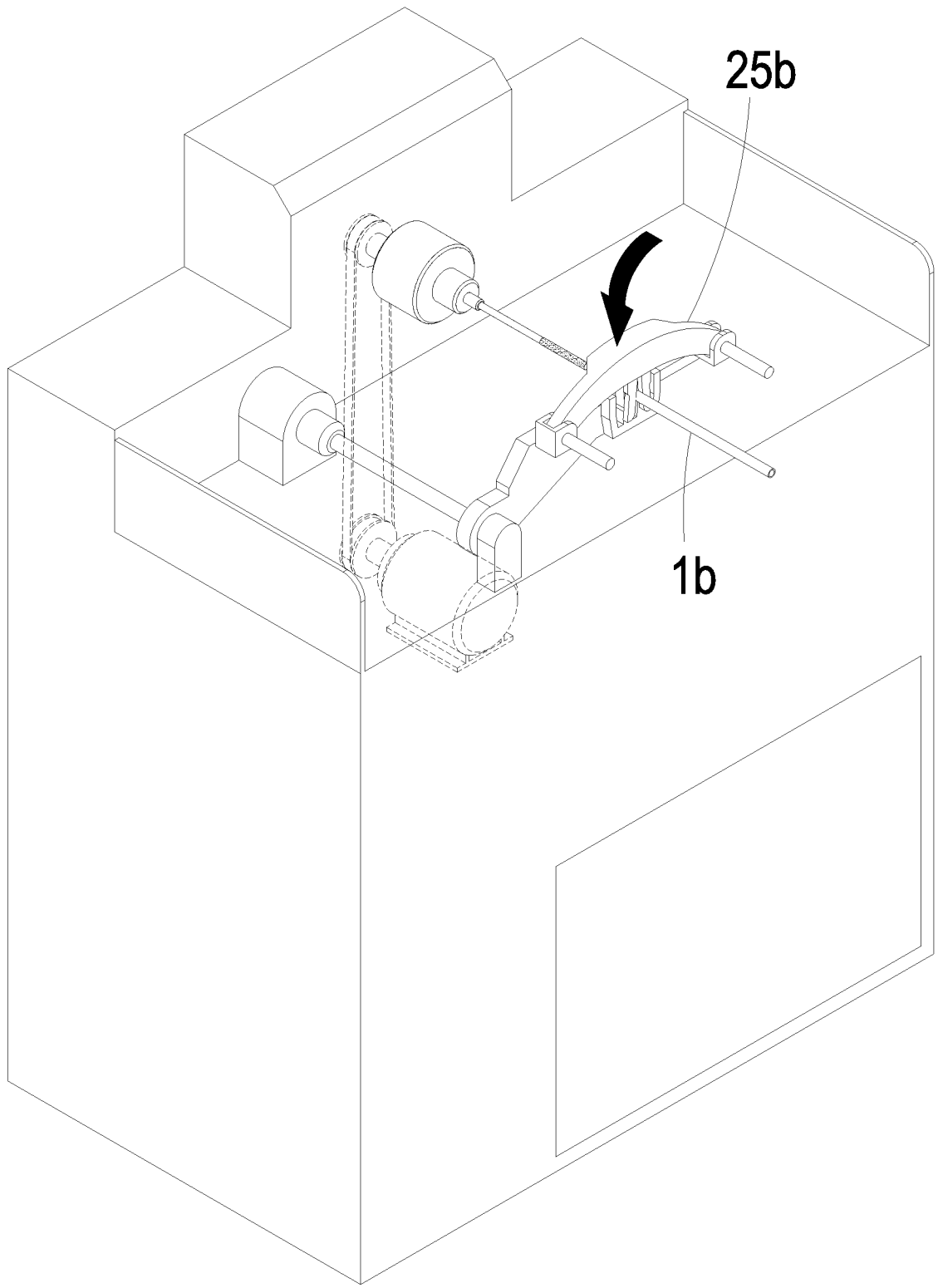
FIG. 14 is a perspective diagram showing another scenario of placing the environmentally friendly straw of FIG. 1 on the honing machine of FIG. 13.
Figure 15:
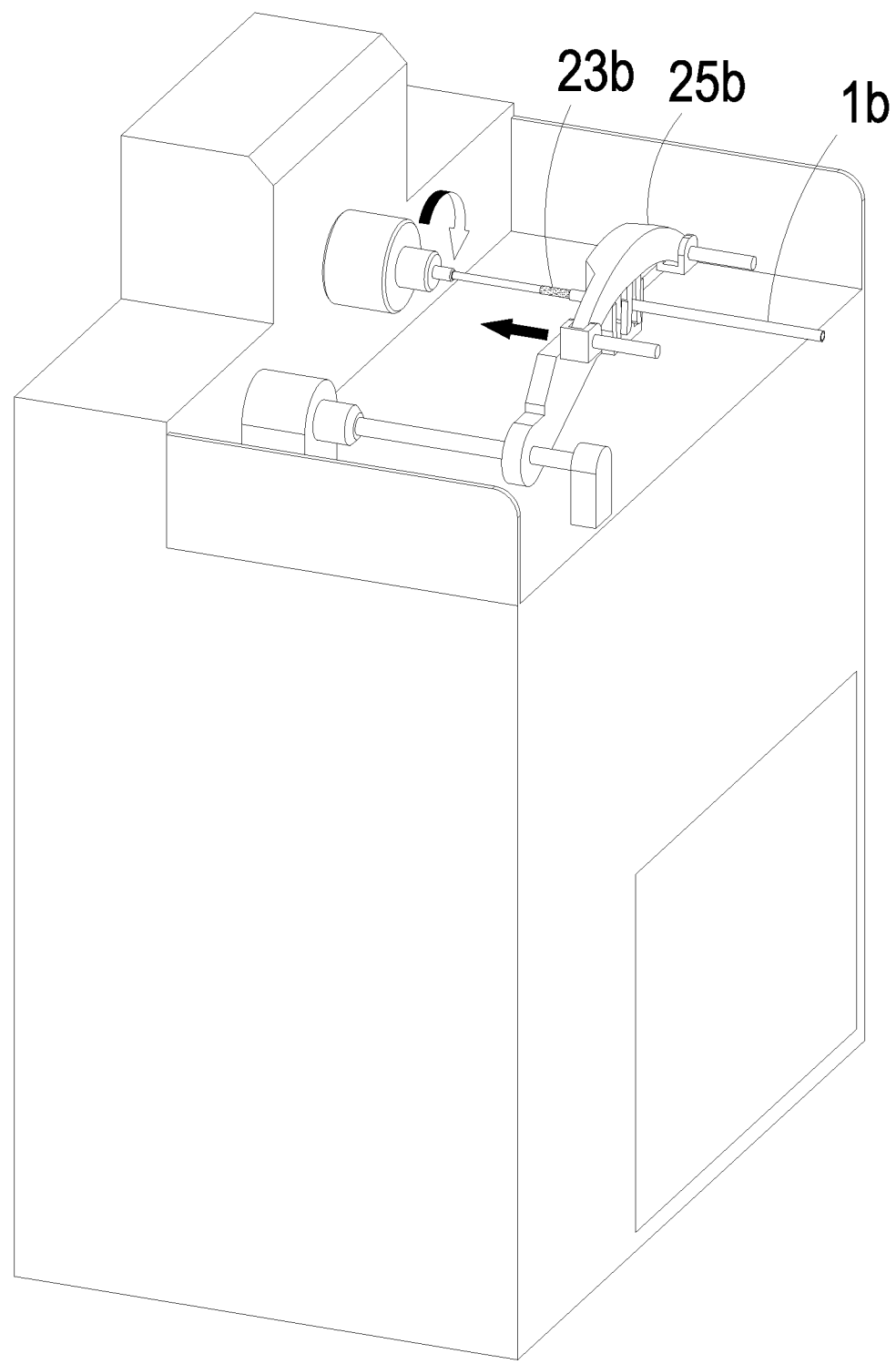
FIG. 15 is a perspective diagram showing a scenario of the environmentally friendly straw of FIG. 1 honed on the honing machine of FIG. 13.

As shown in FIGS. 13 to 15, the honing machine 2b of this embodiment further includes a second reciprocal member 25b disposed to a side of the rotational member 22b, engaging the tubular body 1b into a reciprocal movement.

A step (f1) may be conducted after the step (f), where the second reciprocal member drives the tubular body 1b to move reciprocally, so that it is honed by the spinning abrasive element 23b.

This embodiment adopts a horizontal honing machine 2b, demonstrating that the environmentally friendly straw may be manufactured using either upright or horizontal honing machine 2b.

Figure 16:
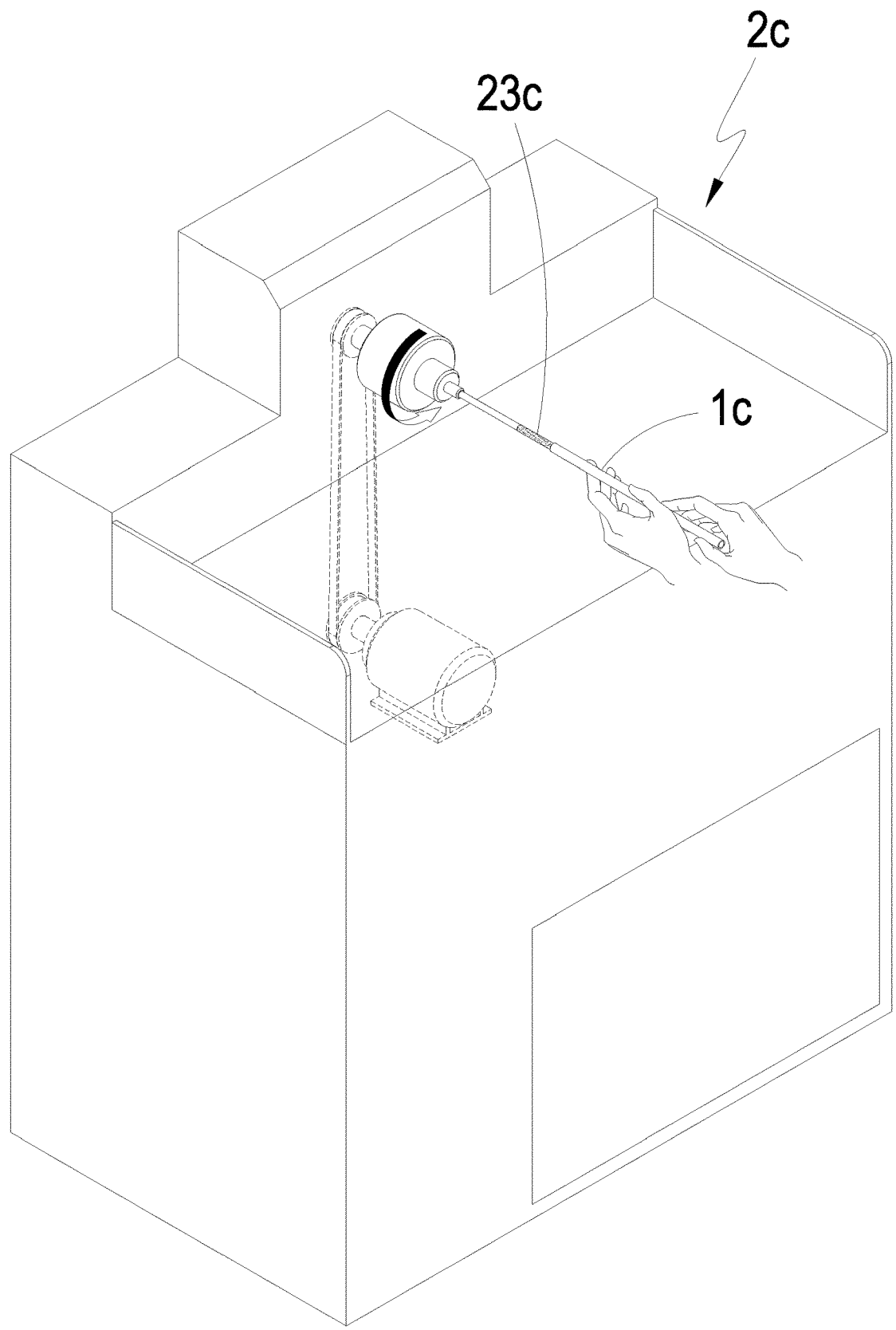
FIG. 16 is a perspective diagram showing a scenario of the environmentally friendly straw of FIG. 1 honed on a honing machine according to a fourth embodiment of the present invention.

As shown in FIG. 16, another embodiment also involves a horizontal honing machine 2c. This embodiment, then, involves manually driving the tubular body 1c reciprocally against the abrasive element 23c. This embodiment demonstrates that the honing of the environmentally friendly straw can be performed manually without resorting to any mechanical driving.

Figure 17:
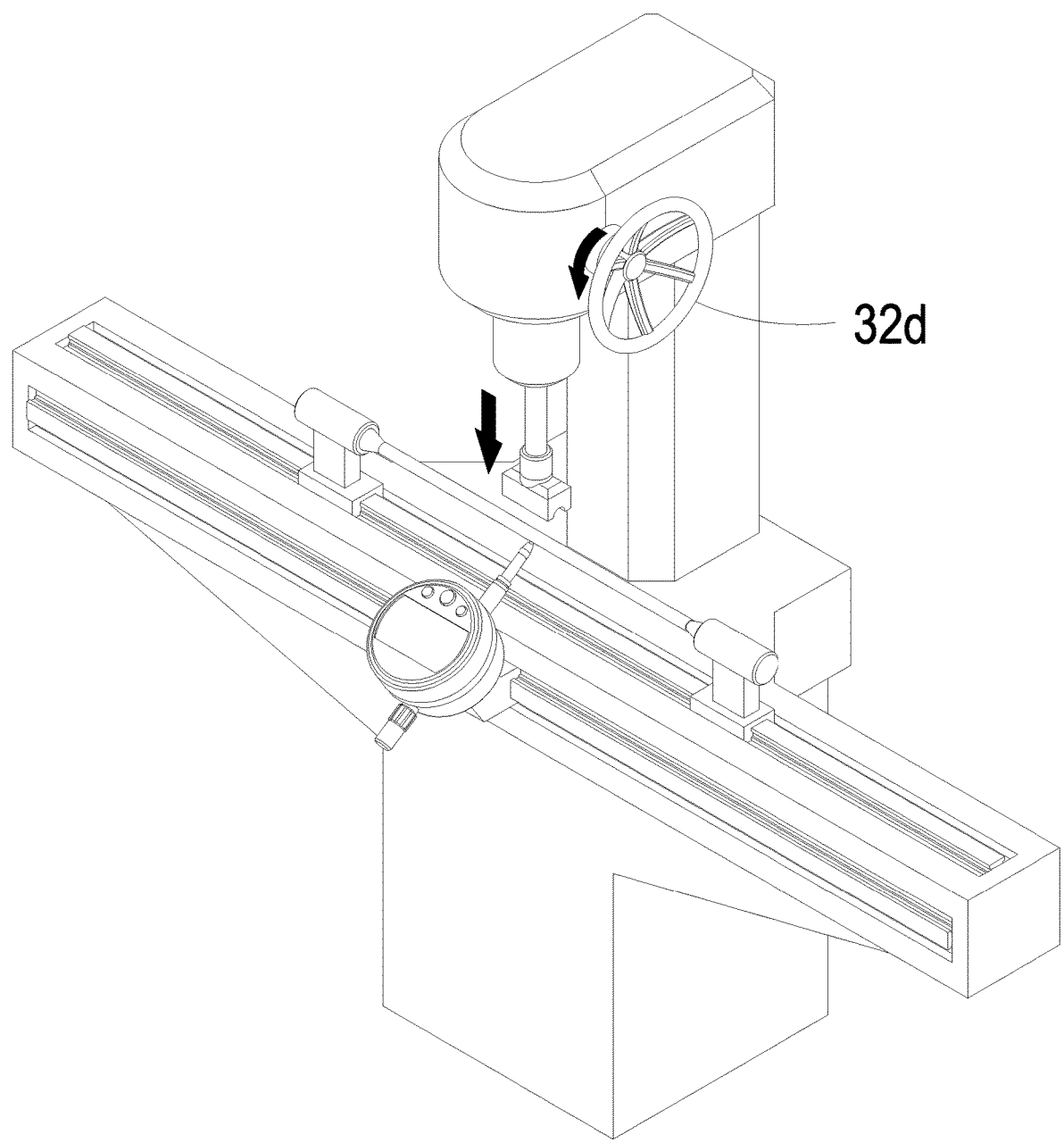
FIG. 17 is a perspective diagram showing a scenario of the environmentally friendly straw of FIG. 1 honed on a honing machine according to a fifth embodiment of the present invention.

As shown in FIG. 17, another embodiment of the leveling machine has a leveling driving member 32d manually operated by a wheel, demonstrating that the leveling driving member 32d may be implemented in various ways.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An apparatus for manufacturing a straw, comprising a leveling machine and a honing machine, wherein the straw comprises:
   a tubular body made of metal and having a through channel inside connecting two openings respectively at two ends of the tubular body, the tubular body comprising:
   an outer layer, which defines an outer circumference surrounding the tubular body between the two openings, and an inner layer, which defines an inner wall of the tubular body, surrounding the channel;
   wherein the leveling machine is operable to implement a leveling operation on the outer layer to straighten the tubular body to achieve predetermined levelness of the tubular body, the predetermined levelness of the tubular body being less than 0.01 mm, and wherein the leveling machine comprises a leveling element having a bottom side in which a trough is formed and extended in an extension direction parallel to the straw held in position in the leveling machine, such that the straw is receivable into the trough to have the outer layer of the tubular body thereof contacting with an inner surface of the trough, wherein the inner surface of the trough comprises a convex shape including a protrusion in a middle of the inner surface and two recesses on two opposite sides of the protrusion in the extension direction, the straw being operated by the leveling machine as being placed in contact with the protrusion of the inner surface of the trough; and
   wherein the honing machine is operable to implement a honing operation on the inner wall of the inner layer to achieve predetermined surface roughness of the inner wall, the predetermined surface roughness of the inner wall including average roughness (Ra) below 0.025 μm, and wherein the honing machine comprises a honing driving member, a rotational member, and at least an abrasive element; the rotational member is joined to and engaged by the honing driving member to spin; the abrasive element is configured around the rotational member; and the inner wall of the tubular body is reciprocally machined by the abrasive element through rotation of the abrasive element caused by the spinning of the rotational member driven by the honing driving member.

2. The apparatus according to claim 1, wherein the honing machine further comprises a first reciprocal member connected to and engaging the rotational member into a reciprocal movement.

3. The apparatus according to claim 1, wherein the honing machine further comprises a second reciprocal member disposed to a side of the rotational member and engaging the tubular body into a reciprocal movement.

4. The apparatus according to claim 1, wherein the leveling machine comprises a plurality of support elements holding the straw in between, a leveling driving member positioned to a side to the support elements, the leveling element being mounted to a bottom end of the leveling driving member for contacting the outer layer of the tubular body, and a straightness measurement member measuring levelness of the tubular body.

5. The apparatus according to claim 4, wherein a cushion element is beneath each support element.

* * * * *